(12) United States Patent
Salter et al.

(10) Patent No.: US 10,118,451 B1
(45) Date of Patent: Nov. 6, 2018

(54) AUTOMATIC TRAILERING MIRROR

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Erick Michael Lavoie, Dearborn, MI (US); Keith Hoelscher, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/698,921

(22) Filed: Sep. 8, 2017

(51) Int. Cl.
*B60D 1/36* (2006.01)
*B60R 1/062* (2006.01)

(52) U.S. Cl.
CPC .............. *B60D 1/36* (2013.01); *B60R 1/062* (2013.01)

(58) Field of Classification Search
CPC ................................... B60D 1/36; B60R 1/062
See application file for complete search history.

(56) References Cited

U.S. PATENT DOCUMENTS

| | | | |
|---|---|---|---|
| 7,114,817 B2 | 10/2006 | Evans et al. | |
| 7,287,867 B2 | 10/2007 | Wellington et al. | |
| 2004/0246608 A1* | 12/2004 | Wellington | B60R 1/07 359/877 |
| 2005/0074143 A1* | 4/2005 | Kawai | B60D 1/36 382/104 |
| 2006/0178787 A1 | 8/2006 | McCall | |
| 2010/0085652 A1 | 4/2010 | Crouse | |
| 2014/0085472 A1* | 3/2014 | Lu | B60R 1/002 348/148 |
| 2017/0282806 A1* | 10/2017 | Peterson | B60R 1/072 |
| 2018/0029534 A1* | 2/2018 | De Wind | B60K 35/00 |

FOREIGN PATENT DOCUMENTS

| | | |
|---|---|---|
| CN | 203753009 U | 8/2014 |
| WO | 01/08926 A1 | 2/2001 |

* cited by examiner

*Primary Examiner* — Aaron L Troost
(74) *Attorney, Agent, or Firm* — Carlson, Gaskey & Olds, P.C.

(57) ABSTRACT

A disclosed system and method for adjusting vehicle mirrors automatically moves mirror assemblies to an extended trailering position in response to initiation of a hitching operation.

14 Claims, 4 Drawing Sheets

AUTOMATIC TRAILERING MIRROR

TECHNICAL FIELD

This disclosure relates to a system for automatically adjusting a position of a tow vehicle side mirror responsive to the tow vehicle approaching a trailer for hitching.

BACKGROUND

Vehicles that are used to sometimes pull trailers can include an extendible side view mirror. The side view mirror is extended when the tow vehicle is towing a trailer to provide increased visibility of the trailer. Extending the side view mirrors is also advantageous when backing up to hitch a trailer to the tow vehicle. In each instance, extending the mirrors and then adjusting the mirrors can be time consuming and tedious.

Automotive manufactures continue to seek improvements in vehicle operation with features that increase customer satisfaction and loyalty.

SUMMARY

A system for adjusting vehicle mirrors according to an exemplary aspect of the present disclosure includes, among other things, a vehicle mirror movable to a trailering position and a controller generating commands to automatically move the vehicle mirror to the trailering position responsive to initiation of a hitching operation.

In a further non-limiting embodiment of the foregoing system for adjusting vehicle side mirrors a memory device includes at least one saved mirror position corresponding with an identified trailer.

In a further non-limiting embodiment of the foregoing system for adjusting vehicle side mirrors the at least one saved mirror position further corresponds with a saved vehicle driver configuration.

In a further non-limiting embodiment of the foregoing system for adjusting vehicle side mirrors the vehicle mirror comprises a side mirror that is extendible to the trailering position and the saved mirror position comprises adjustment of the side mirror to correspond with the identified trailer once in the trailering position.

In a further non-limiting embodiment of the foregoing system for adjusting vehicle side mirrors the initiation of a hitching operation is indicated responsive to activation of an automatic hitching system that guides the vehicle along a path to align a vehicle hitch with the identified trailer.

In a further non-limiting embodiment of the foregoing system for adjusting vehicle side mirrors a detection device detects that a trailer is proximate the vehicle and the controller indicates initiation of the hitching operation responsive to detection of the trailer and the vehicle being in a reverse gear.

In a further non-limiting embodiment of the foregoing system for adjusting vehicle side mirrors the detection device includes at least one of a camera and a radar device for detecting a trailer proximate the vehicle.

In a further non-limiting embodiment of the foregoing system for adjusting vehicle side mirrors a token on the trailer communicates with the controller of the vehicle to determine if a detected trailer corresponds with an identified trailer with a previously saved mirror position.

A method according to another exemplary aspect of the present disclosure includes, among other things, a method of automatically adjusting vehicle mirrors including storing at least one saved mirror trailering position in a memory device on the vehicle and moving a vehicle mirror to the saved mirror trailering positon according to commands generated by the controller responsive to initiation of a hitching operation.

In a further non-limiting embodiment of any of the foregoing methods storing the at least one saved mirror trailering position corresponds with an identified trailer.

In a further non-limiting embodiment of the foregoing method including identifying the trailer based on information in a token disposed on the trailer and reading the token with a detection device disposed on the vehicle.

In a further non-limiting embodiment of any of foregoing methods including generating a signal from a token on a trailer to communicate identifying information of the trailer to the controller of the vehicle utilized to determining if the trailer is an identified trailer.

In a further non-limiting embodiment of any of foregoing methods including storing the at least one saved mirror trailering position to correspond with a saved vehicle driver configuration.

In a further non-limiting embodiment of any of foregoing methods including detecting initiation of a hitching operation responsive to a detection device detecting that a trailer is proximate the vehicle and the vehicle being in a reverse gear.

In a further non-limiting embodiment of any of foregoing methods the detection device comprises one of a camera and a radar device of the vehicle.

In a further non-limiting embodiment of any of foregoing methods including detecting initiation of a hitching operation responsive to actuation of an automatic hitching system.

The various features and advantages of this disclosure will become apparent to those skilled in the art from the following detailed description. The drawings that accompany the detailed description can be briefly described as follows.

DETAILED DESCRIPTION

Figure 1:
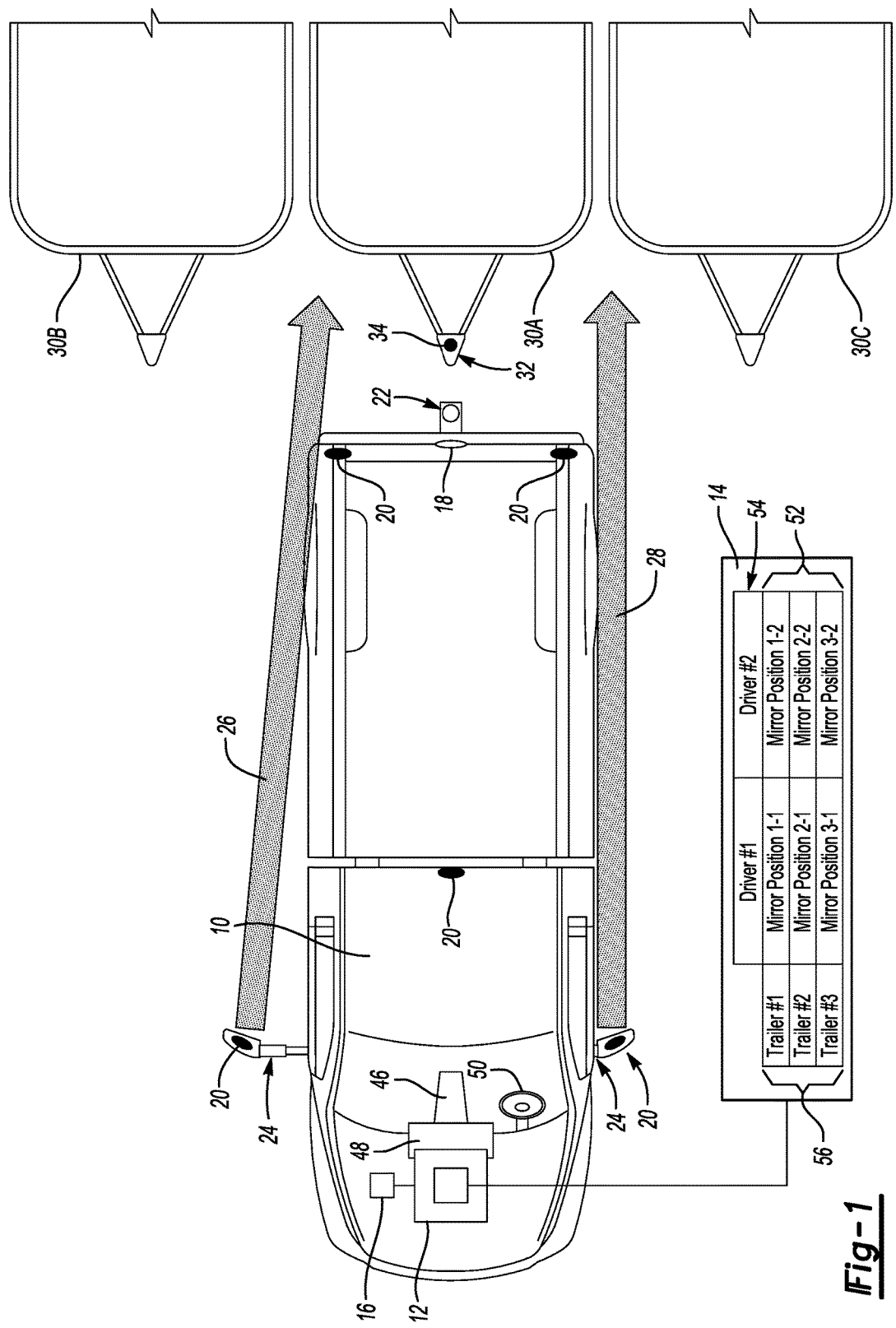
FIG. 1 is a schematic representation of a tow vehicle and several trailers.

Referring to FIG. 1, an example vehicle 10 is schematically shown and includes an engine 48 that drives a transmission 46 and is at least partially controlled by a vehicle controller 12. The vehicle 10 includes a hitch 22 that can be connected to one of several trailers 30A-C. The tow vehicle 10 includes a camera 18 and detection devices schematically illustrated at 20. The tow vehicle 10 further includes side mirror assemblies 24 that are extendable to provide an improved view schematically illustrated at 26 for use when pulling a trailer. The side view mirror assemblies 24 are typically provided in a normal non-extended position to provide a normal rearview indicated schematically at 28. However, when the vehicle 10 is towing a trailer, it is desired for the side view mirror assemblies 24 to be in an extended position to provide the desired improved view schematically indicated at 26.

The disclosed vehicle controller 12 includes a memory device 14 that stores a plurality of mirror positions 52 that correspond with a saved identified trailer configuration 56 and driver 54. The mirror positions 52 are saved during the first setup process for each trailer.

The example vehicle controller 12 also includes an auto-hitch system 16 that controls the vehicle 10 to move the ball hitch 22 into alignment with the hitch 32 of a desired one of the trailers 30A-C. The disclosed auto-hitch system 16 takes over operation of the engine 48, transmission 46 and steering systems 50 to define a path of the vehicle 10 to align the ball hitch 22 and the trailer hitch 32. During the hitching operation, it is desired to move the side view mirrors 24 to the extended position to provide a better view of the trailer and aid in aligning the vehicle. Moreover, when the vehicle 10 is being operated with the auto-hitch system 16, the operator may desire to view progress of the hitching operation even though the auto-hitch system 16 is controlling the vehicle and placing it within alignment with the trailer hitch 32.

Adjustment of the side view mirror assemblies 24 in one disclosed embodiment is automatically initiated upon recognition by the controller 12 that the vehicle is performing a hitching operation. The controller 12 recognizes initiation of hitching operation when the auto-hitch system 16 is engaged. Once the controller 12 recognizes that the auto-hitch system 16 has been engaged, the controller will generate commands to automatically move the side view mirrors 24 into the extended trailering position to provide the desired improved viewing angles schematically indicated at 26.

In another disclosed embodiment, the controller 12 will recognize that a hitching operation has occurred when the vehicle transmission 46 is placed in a reverse gear and an identified one of the trailers 30A-C is recognized proximate the vehicle 10. FIG. 1 illustrates trailer 30A, 30B and 30C. Of the trailers 30A-C, only 30A is an identified trailer with a configuration that has been saved in the memory device 14. The controller 12 will utilize the detection devices 20 and/or camera 18 to recognize an identified trailer 30A that is proximate a rear portion of the vehicle 10 to recognize initiation of a hitching operation.

The controller 12 through the detection devices 20 and/or the camera 18 may detect several trailers proximate the vehicle when the vehicle is put into a reverse gear. However, if none of those trailers correspond with a saved trailer configuration 56, the side view mirrors 24 will not automatically be adjusted to a desired extended trailering position. Accordingly, the example controller 12 recognizes and identifies a trailer 30A-C with the detection devices 20 and/or the camera 18 and matches the identified trailer with a configuration stored within the memory device 14.

In one disclosed example, the trailer 30A includes a token 34 that communicates with the controller 12 to identify itself as an identified trailer that has been towed by the vehicle 10 previously and includes a saved mirror position 52.

Detection of a trailer as previously being attached to the vehicle 10 can be provided by use of the camera 18 to identify a visible feature on the trailer 38. The visible feature may include a barcode, number or other identifying feature of the trailer that can be viewed by the camera 18 and identifies the trailer 30A.

The token 34 may also be a transmitting device such as a Bluetooth low energy device and the detection devices 20 may be antennas that receive signals from the token 34. The signal emitted by the token 34 communicates an identity of the trailer 30A to the vehicle 10. Once identified and matched to previously saved mirror position 52, the controller 12 automatically generates commands to move the mirror assemblies to the extended trailering position.

Figure 2:
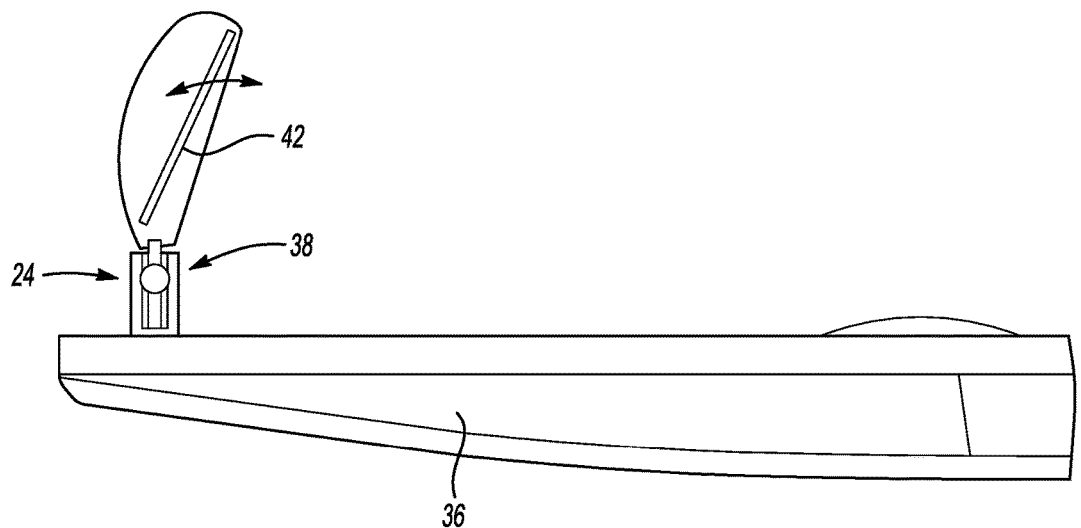
FIG. 2 is a top view of a side view mirror in a non-extended position.
Figure 3:
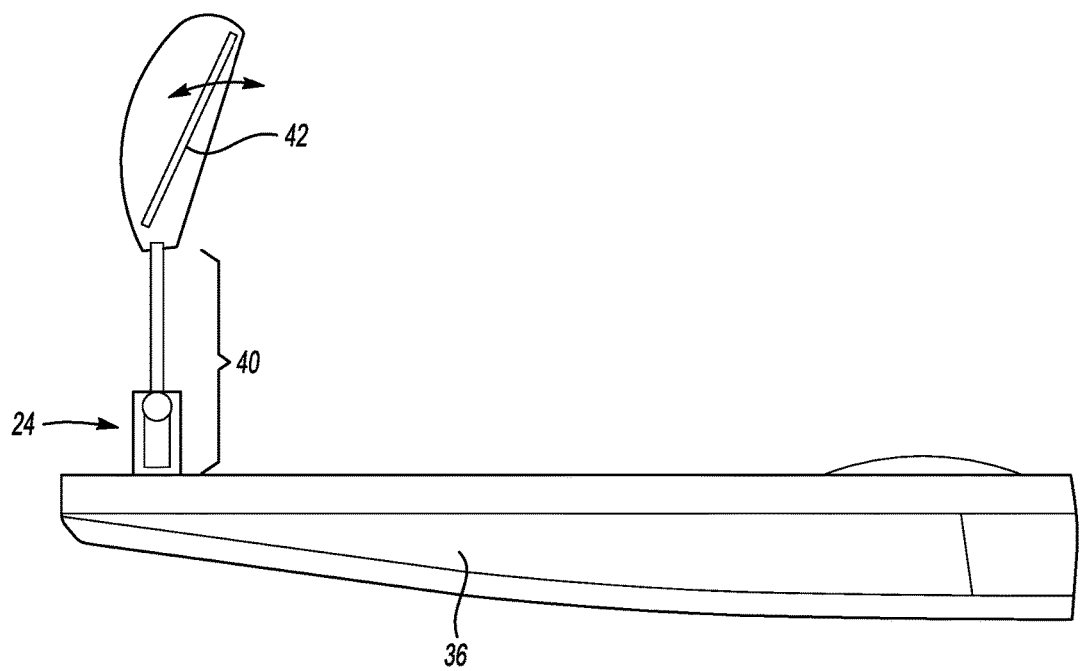
FIG. 3 is a top view of a side view mirror in an extended position.

Referring to FIGS. 2 and 3 with continued reference to FIG. 1, each of the side view mirror assemblies 24 are supported on a vehicle door 36 and movable from a non-extended or normal position illustrated in FIG. 2 and schematically indicated at 38 to an extended trailering position illustrated at 40 in FIG. 3. Once in the extended trailering position 40, the mirror 42 can be tilted in various directions to provide the desired viewing angle as is shown at 26 in FIG. 1. The example system automatically moves the side view mirror assemblies 24 to the extended trailering position as well as adjusting the mirror 42 to a desired angle that corresponds with the previously saved position 52 that corresponds with a detected and identified trailer 30A. Additionally, the specific position of the mirror 42 may also be associated with one of several saved driver configurations 54 for the vehicle 10.

Figure 4:
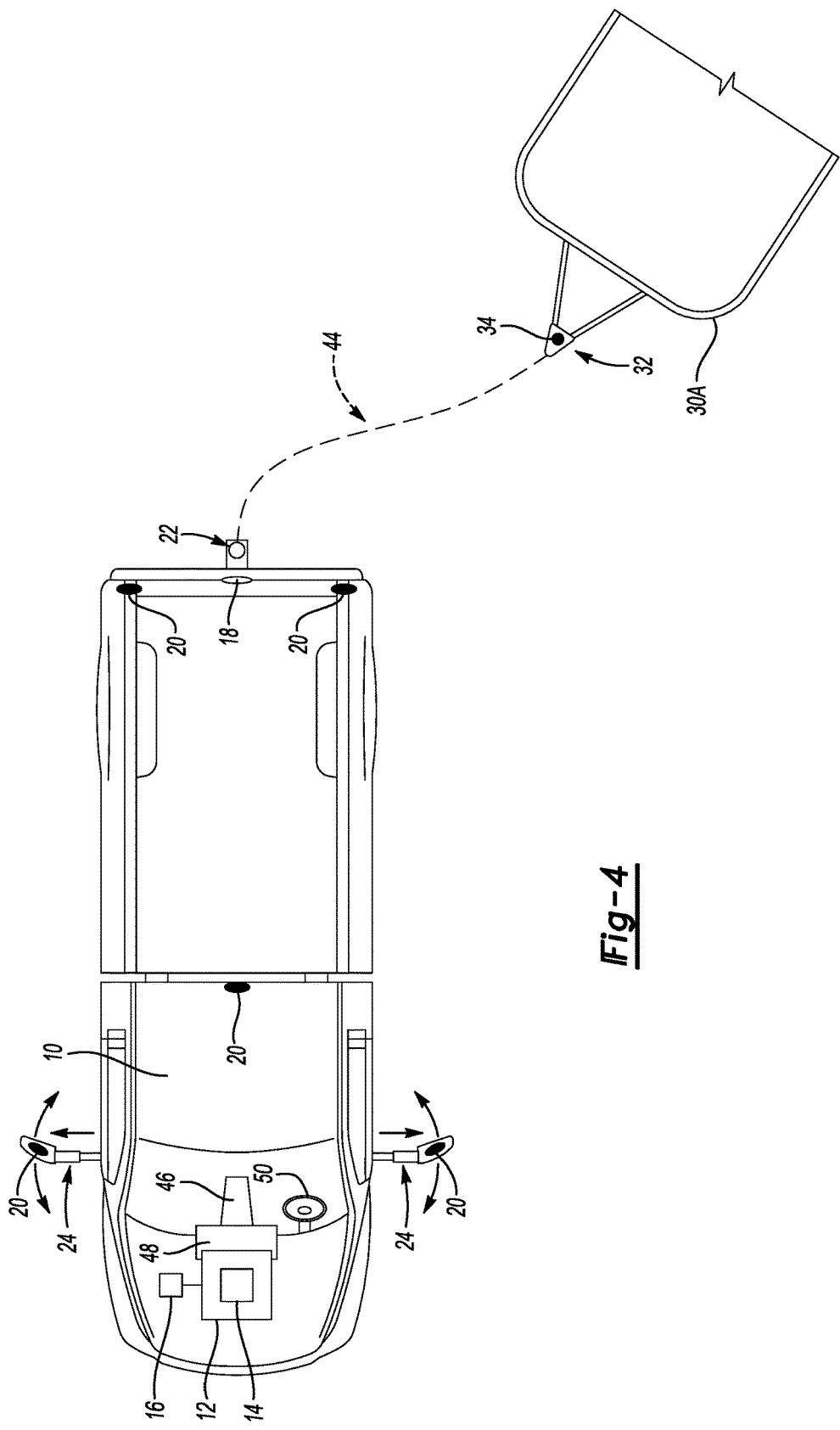
FIG. 4 is a schematic view of a path between a tow vehicle and trailer defined by an auto-hitch system.

Referring to FIG. 4 with continued reference to FIG. 1, the auto-hitch system 16 utilizes the camera 18 as well as the detection devices 20 disposed throughout the vehicle 10 to determine a path 44 to align the hitch ball 22 with the trailer hitch 38. In this disclosed example, the vehicle 10 is communicating with the token 34 on the trailer 30A to identify the trailer 30A as corresponding with a saved side view mirror position 52.

In one disclosed embodiment, the camera 18 disposed a rear portion of the vehicle 10 is utilized to determine the path 44. In another embodiment, the detection devices 20 disposed about the vehicle 10 are antennas that receive wireless information from the trailer 30A. The detection devices 20 may also be radar emitters that are utilized to detect the presence of an object at the rear of the vehicle, confirm that that object is a trailer and then generate a desired path 44 to align the hitch ball 22 with the trailer hitch 32.

Figure 5:
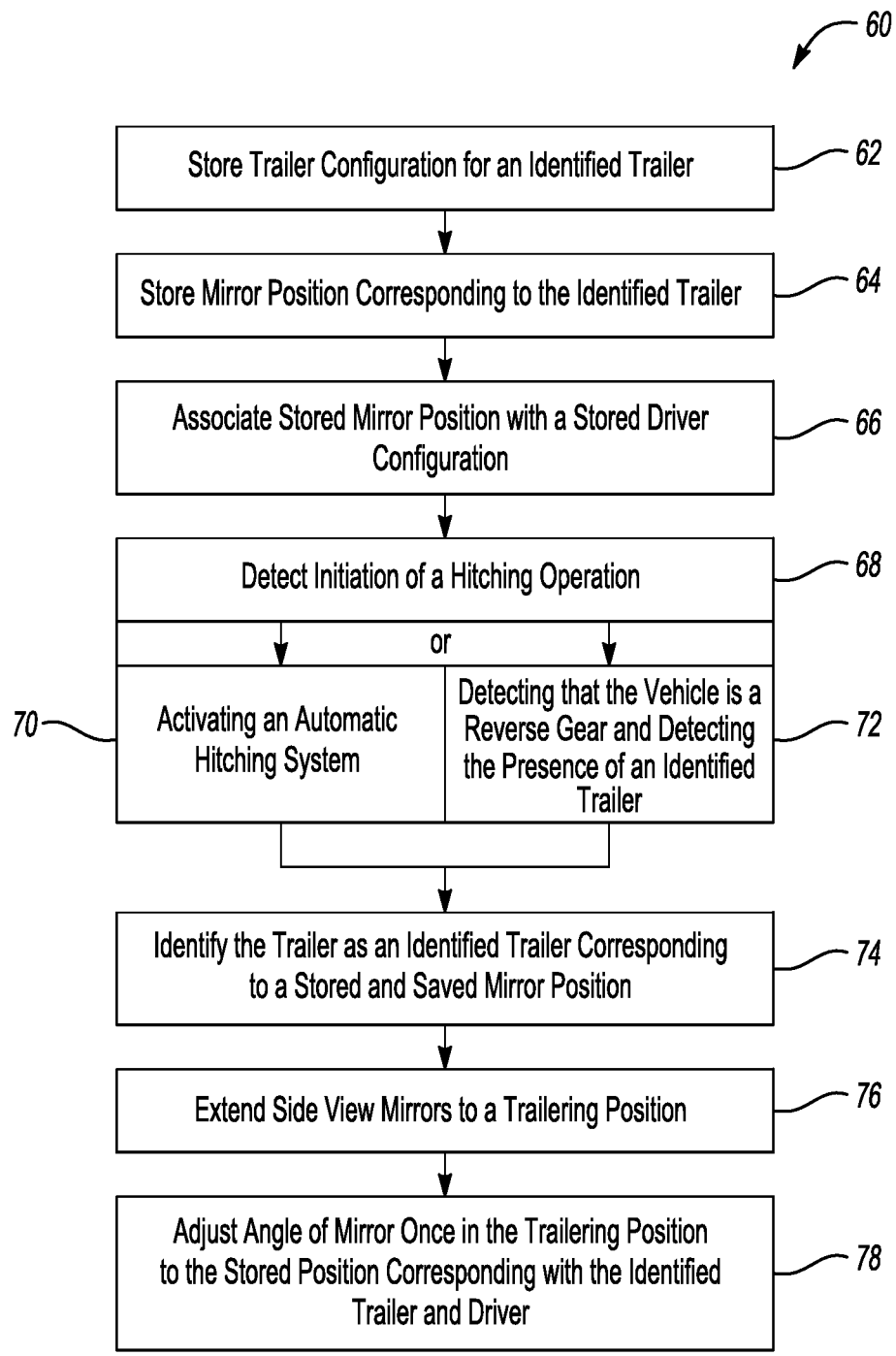
FIG. 5 is a flow diagram of the example method steps according to a disclosed embodiment.

Referring to FIG. 5 with continued reference to FIG. 1, an example method is schematically illustrated and method steps are generally indicated at 60. The example method 60 includes an initial step 62 of storing a trailer configuration 56 and side mirror position 52 that corresponds with a trailer and a driver.

Storing of the mirror positions 52 in the memory device 14 in a manner that corresponds with an identified trailer as is indicated at 64. Associating the mirror position 52 with one of several stored driver configurations is indicated at 66. Of course it should be understood if only one driver configuration is saved within the vehicle then the stored mirror position would be associated with that driver. Moreover, the mirror position could be schematically illustrated on a display within the vehicle upon identification of an identified trailer approximate the aft end of the vehicle. A user may then pick a specific mirror configuration that corresponds with the identified trailer. As appreciated, there may be several configurations saved for any one trailer and an operator would be able to select a desired one of several of the side mirror positions that correspond with the identified trailer. Moreover, a default extended trailering positon could be saved in the memory device for selection should a saved configuration for a specific trailer not be present. The default mirror positon would extend the side view mirror assemblies 24 to provide an improved viewing angle for a new trailer.

The user may than make minor adjustments and save the mirror position along with the new trailer configuration in the memory 14.

The automatic detection that a hitching operation has been initiated is schematically indicated in 68 and may be performed in different manners depending on the specific configuration and devices present within the tow vehicle 10. In one disclosed embodiment shown at 70 for a vehicle 10 that includes an auto-hitch system 16, activation of that auto-hitch system 16 signals the controller 12 that a hitching operation has been initiated.

In another disclosed embodiment indicated at 72, initiation of a hitching operation is recognized if the vehicle transmission 46 is placed in a reverse gear and an identified trailer 30A is detected proximate the vehicle 10. Detection of an identified trailer 30A-C can be accomplished by several different means depending on the equipment and configuration of the tow vehicle 10. In one disclosed embodiment, detection is provided by the camera 18. In another disclosed embodiment, detection devices 20 such as antenna or radar disposed at different locations on the vehicle 10 are utilized to communicate with a wireless communication device mounted to the trailer. Although several means of detecting an identified trailer proximate the tow vehicle 10 are disclosed, other methods and systems for communicating, detecting and identifying a trailer to a vehicle prior to hitching an connection of a trailer to the tow vehicle could be utilized and are within the contemplation of this disclosure.

The example method 60 further proceeds once the trailer has been identified as a trailer that corresponds with a stored and saved extended trailering mirror position as indicated at 74. Once the mirror position corresponding with the identified trailer is found, the controller 12 generates commands to extend the side view mirrors to the extended trailering position to provide the viewing angle indicated at 26 in FIG. 1.

Once moved to the extended trailering position, the mirror 42 angled to correspond with the specific trailer and saved configurations of the motor vehicle.

Accordingly, the example side view mirror automatic adjustment system identifies that the vehicle is involved in a hitching operation and automatically moves the side view mirrors to an extended trailer position that corresponds with an identified trailer. Accordingly, the example system eases the burden on the vehicle operator during a hitching operation by automatically moving the side view mirrors to a predefined optimal viewing position to make hitching of a trailer easier and more efficient.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for adjusting vehicle mirrors comprising:
    a vehicle mirror movable to one of a plurality of trailering positions;
    a detection device identifying a trailer proximate to but not hitched to the vehicle;
    a memory device including at least one saved mirror position corresponding with one of the plurality of trailering positions corresponding with an identified trailer; and
    a controller for communicating with a token on the trailer to determine if the detected trailer corresponds with an identified trailer and generating commands to automatically move the vehicle mirror to one of the plurality of trailering positions corresponding with the identified trailer responsive to initiation of a hitching operation and detection of the identified trailer.

2. The system as recited in claim 1, wherein the at least one saved mirror position further corresponds with a saved vehicle driver configuration.

3. The system as recited in claim 1, wherein the vehicle mirror comprises a side mirror that is extendible to the trailering position and the saved mirror position comprises adjustment of the side mirror to correspond with the identified trailer once in the trailering position.

4. The system as recited in claim 1, wherein the initiation of a hitching operation is indicated responsive to activation of an automatic hitching system that guides the vehicle along a path to align a vehicle hitch with the identified trailer.

5. The system as recited in claim 1, wherein the detection device includes at least one of a camera and a radar device for detecting a trailer proximate the vehicle.

6. The system as recited in claim 1, including a token on the trailer that communicates with the controller of the vehicle to determine if a detected trailer corresponds with an identified trailer with a previously saved mirror position.

7. A method of automatically adjusting vehicle mirrors comprising:
    storing at least one saved mirror trailering position in a memory device on the vehicle, wherein the at least one saved mirror trailering position corresponds with a previously identified trailer;
    generating a signal from a token on a trailer to communicate identifying information of the trailer to the controller of the vehicle utilized to determining if the trailer is an identified trailer; and
    moving a vehicle mirror to the saved mirror trailering position according to commands generated by a controller responsive to initiation of a hitching operation.

8. The method as recited in claim 7, including identifying the trailer based on information in a token disposed on the trailer and reading the token with a detection device disposed on the vehicle.

9. The method as recited in claim 7, including storing the at least one saved mirror trailering position to correspond with a saved vehicle driver configuration.

10. The method as recited in claim 7, including detecting initiation of a hitching operation responsive to a detection device detecting that a trailer is proximate the vehicle and the vehicle being in a reverse gear.

11. The method as recited in claim 10, wherein the detection device comprises one of a camera and a radar device of the vehicle.

12. The method as recited in claim 7, including detecting initiation of a hitching operation responsive to actuation of an automatic hitching system.

13. A system for adjusting vehicle mirrors comprising:
- a vehicle mirror movable to a trailering position;
- a detection device detecting that a trailer is proximate the vehicle;
- a controller that indicates initiation of a hitching operation responsive to detection of the trailer and the vehicle being in a reverse gear and generates commands to automatically move the vehicle mirror to the trailering position; and
- a token on the trailer that communicates with the controller of the vehicle to determine if a detected trailer corresponds with an identified trailer with a previously saved mirror position.

14. The system as recited in claim 13, wherein initiation of the hitching operation is further indicated in response to activation of an automatic hitching system that guides the vehicle along a path to align a vehicle hitch with the identified trailer.

\* \* \* \* \*